(12) United States Patent
Lan et al.

(10) Patent No.: US 9,733,771 B2
(45) Date of Patent: Aug. 15, 2017

(54) TOUCH PANEL

(71) Applicant: TPK Touch Systems (Xiamen) Inc., Xiamen (CN)

(72) Inventors: Meifang Lan, Xiamen (CN); Pudi Hong, Xiamen (CN); Yiyun Lai, Zhangzhou (CN); Liang-Yi Chang, Taoyuan (TW)

(73) Assignee: TPK Touch Systems (XIAMEN) Inc, Xiamen (CN)

( * ) Notice: Subject to any disclaimer, the term of this patent is extended or adjusted under 35 U.S.C. 154(b) by 4 days.

(21) Appl. No.: 14/597,163

(22) Filed: Jan. 14, 2015

(65) Prior Publication Data
US 2015/0199050 A1 Jul. 16, 2015

(30) Foreign Application Priority Data
Jan. 15, 2014 (CN) .......................... 2014 1 0032032

(51) Int. Cl.
*G06F 3/041* (2006.01)
*G06F 3/044* (2006.01)

(52) U.S. Cl.
CPC .................................. *G06F 3/044* (2013.01)

(58) Field of Classification Search
USPC ...................... 345/173, 174, 205; 178/18.06
See application file for complete search history.

(56) References Cited

U.S. PATENT DOCUMENTS

| | | | | |
|---|---|---|---|---|
| 8,552,315 B2* | 10/2013 | Yilmaz | ................ | G06F 3/044 178/18.06 |
| 8,866,775 B2* | 10/2014 | Xie | ................ | G06F 3/046 345/173 |
| 2010/0214266 A1* | 8/2010 | Koshihara | ............ | G06F 3/044 345/174 |
| 2012/0062472 A1* | 3/2012 | Yilmaz | ................ | G06F 3/041 345/173 |
| 2012/0081329 A1* | 4/2012 | Kim | ................ | G06F 3/045 345/174 |
| 2012/0256642 A1* | 10/2012 | Badaye | ................ | G06F 3/044 324/658 |
| 2013/0021296 A1* | 1/2013 | Min | ................ | G06F 3/044 345/174 |
| 2013/0201116 A1* | 8/2013 | Huang | ................ | G06F 3/044 345/173 |
| 2014/0015766 A1* | 1/2014 | Lin | ................ | G06F 3/044 345/173 |
| 2014/0028580 A1* | 1/2014 | Lin | ................ | G06F 3/044 345/173 |

(Continued)

*Primary Examiner* — Thuy Pardo
(74) *Attorney, Agent, or Firm* — Paul Bendemire

(57) ABSTRACT

A touch panel includes a plurality of first axial electrodes, a plurality of second axial electrodes and trace region. The first axial electrodes extend along a first axial direction. The second axial electrodes extend along the first axial direction and disposed to insulatively correspond to the first axial electrodes. Each of the second axial electrodes includes a central electrode, and a plurality of first branch electrodes which are electrically coupled to the central electrode, and have areas different from one another. Each of the first branch electrodes overlaps a corresponding one of the first axial electrodes. The trace region is disposed at one side of the first and second axial electrodes along the first axial direction.

17 Claims, 6 Drawing Sheets

(56) References Cited

U.S. PATENT DOCUMENTS

| | | | |
|---|---|---|---|
| 2014/0292708 A1* | 10/2014 | Kwon, II | G06F 3/044 345/174 |
| 2015/0199055 A1* | 7/2015 | Prendergast | G06F 3/044 345/174 |
| 2016/0188100 A1* | 6/2016 | Teranishi | G06F 3/044 345/174 |

* cited by examiner

US 9,733,771 B2

TOUCH PANEL

BACKGROUND OF THE INVENTION

This application claims priority of Chinese Patent Application No. 201410032032.X, filed on Jan. 15, 2014.

FIELD OF THE INVENTION

The invention relates to a touch-sensing technical field, more particularly to a touch panel.

DESCRIPTION OF THE RELATED ART

In the current market of various commercial electronic products, portable electronic products, such as personal digital assistants (PDA), mobile phones, notebook computers and tablet PCs, have widely adopted touch panels as interfacing means for data communication. In addition, since the design of current electronic products tends toward lightweight and slender, omission of some conventional input devices, such as keyboard and mouse, is desirable in product design. Particularly, urged by the demands of the tablet PCs that emphasize user-friendly designs, touch panels have become one of the key components.

Conventional touch panels usually have X-direction electrodes and Y-direction electrodes intersect to be mutually insulatively disposed. As such, conductive wires, which are respectively connected to the X-direction and Y-direction electrodes, extend outwardly from the X-direction and Y-direction electrodes and are at least laid-out at two adjacent lateral sides of the touch panels. With the area of the touch panel fixed, the more area the lateral zones occupy, the more limiting the viewable region of the touch panel becomes.

SUMMARY OF THE INVENTION

According to one embodiment of the present invention, there is provided a touch panel including a plurality of first axial electrodes, a plurality of second axial electrodes and trace region. The first axial electrodes extend along a first axial direction. The second axial electrodes extend along the first axial direction and are disposed to insulatively correspond to the first axial electrodes. Each of the second axial electrodes includes a central electrode, and a plurality of first branch electrodes which are electrically coupled to the central electrode and have areas different from one another. Each of the first branch electrodes overlaps a corresponding one of the first axial electrodes. The trace region is disposed at one side of the first and second axial electrodes along the first axial direction.

BRIEF DESCRIPTION OF THE DRAWINGS

Other features and advantages of the present invention will become apparent in the following detailed description of the exemplary embodiments with reference to the accompanying drawings, of which.

DETAILED DESCRIPTION OF THE EMBODIMENTS

Figure 1:
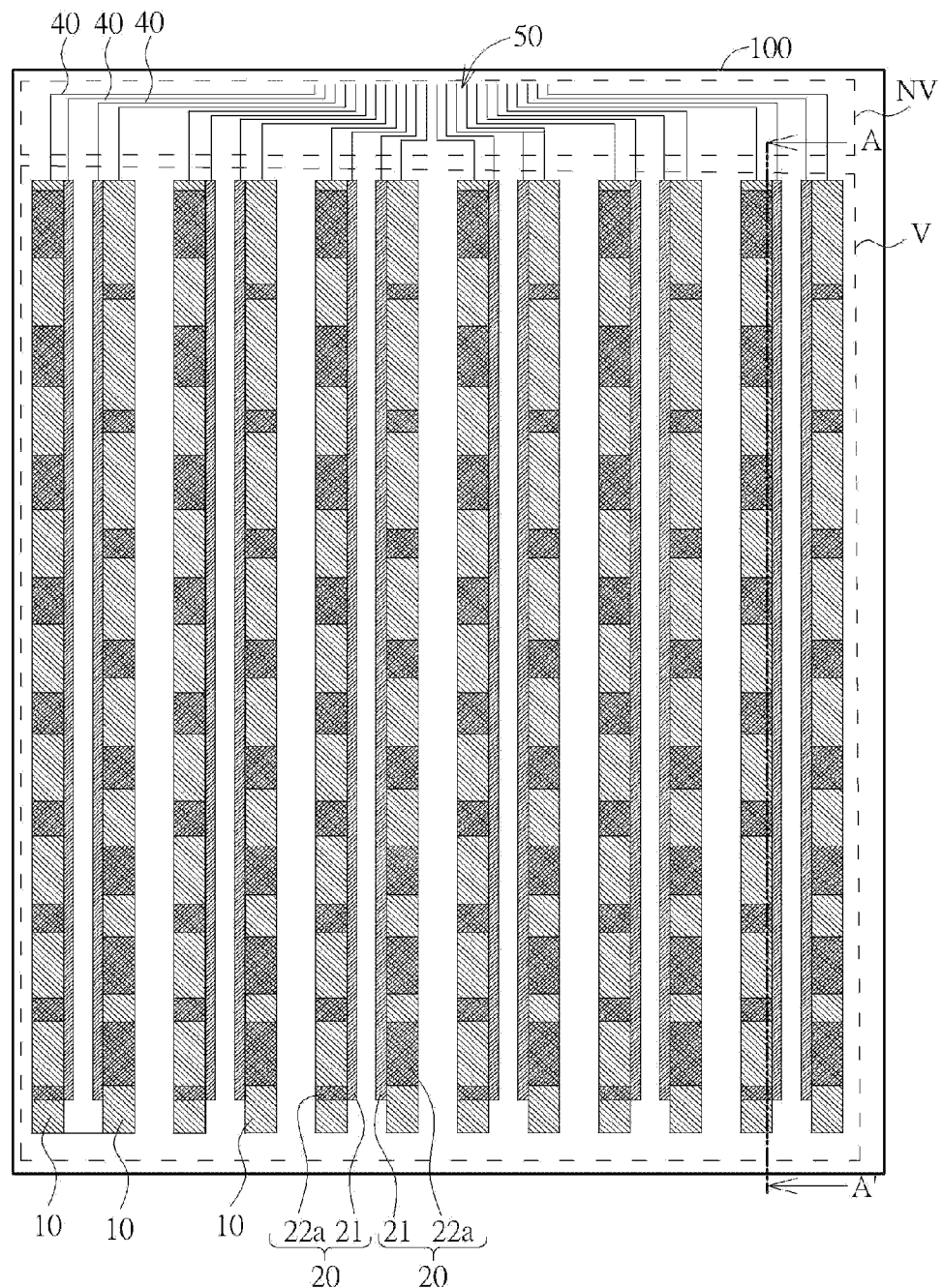
FIG. 1 is a structural schematic view of an exemplary embodiment of a touch panel according to the invention.

Before the present invention is described in greater detail, it should be noted that like elements are denoted by the same reference numerals throughout the disclosure.

Figure 2:
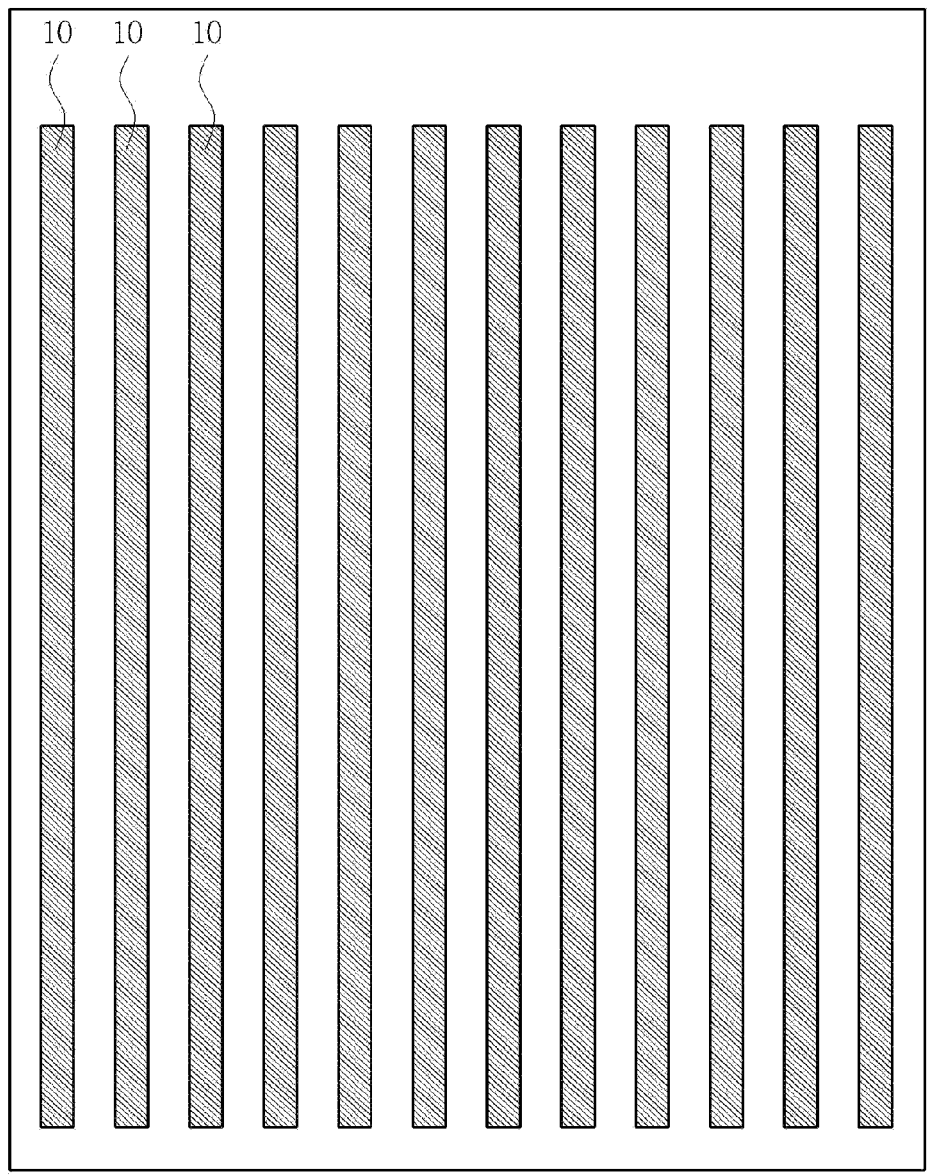
FIG. 2 is a schematic view of the exemplary embodiment of FIG. 1, illustrating a plurality of first axial electrodes.
Figure 3:
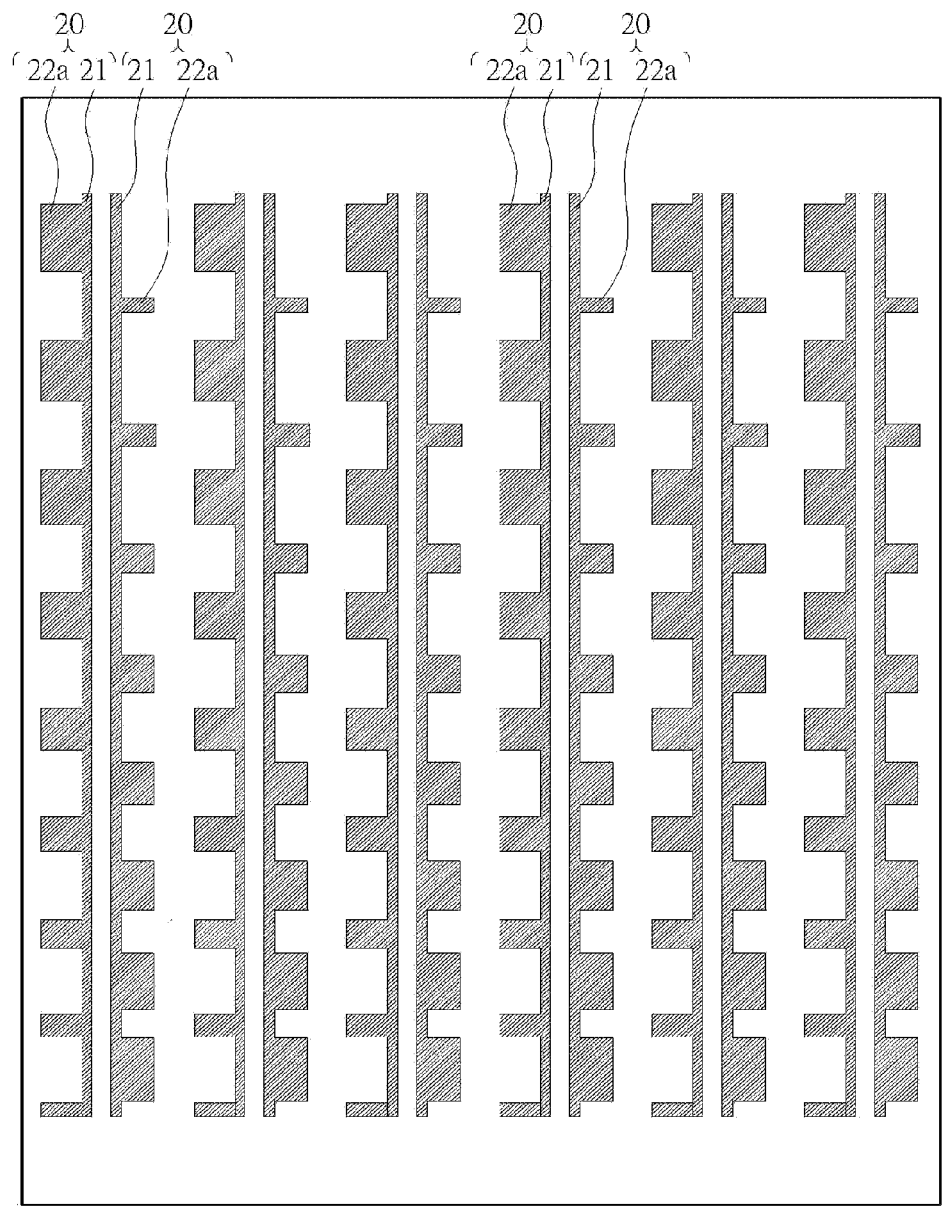
FIG. 3 is a schematic view of the exemplary embodiment of FIG. 1, illustrating a plurality of second axial electrodes.

Referring simultaneously to FIGS. 1 to 3, a touch panel 1 of an exemplary embodiment according to the present invention is shown and illustrated to include a plurality of first axial electrodes 10 extending along a first axial direction (such as a Y axis), a plurality of second axial electrodes 20 extending along the first axial direction, and a trace region 50. The second axial electrodes 20 are disposed insulatively with and correspondingly to the first axial electrodes 10. Each of the second axial electrodes 20 includes a central electrode 21, and a plurality of first branch electrodes 22a that are electrically coupled to the central electrode 21 and that have areas different from one another. Each of the first branch electrodes 22a overlaps a corresponding one of the first axial electrodes 10. In addition, the trace region 50 is disposed at one side of the first and second axial electrodes 10, 20 along the first axial direction. In practice, the area where the first and second axial electrodes 10, 20 are formed is a touch-control area, often referred to as a viewable area (V), and the area where the trace region 50 is located is a non-viewable area (NV).

To be more specific, in this embodiment, the first axial electrodes 10 are configured substantially as longitudinal strips in the first axial direction and are parallel to one another and spacingly arranged. The central electrodes 21 of the second axial electrodes 20 extend along the first axial direction and are disposed correspondingly in position to spaces between adjacent pairs of the first axial electrodes 10. In other words, the central electrodes 21 of each of the second axial electrodes 20 is disposed at a space between a corresponding adjacent pair of the first axial electrodes 10. The first branch electrodes 22a of each of the second axial electrodes 20 extend from the central electrode 21 and along a second axial direction (such as an X axis) so as to constitute a serrated pattern for the second axial electrode 20. As shown from the top plan aspects of FIGS. 1 and 3, the first branch electrodes 22a in each of the second axial electrodes 20 extend toward one and the same side (e.g., a left side or a right side) in the second axial direction. However, the practical design of the first branch electrodes 22a is not limited thereto; that is, the first branch electrodes 22a of different second axial electrodes 20 may all extend toward one single side along the second axial direction according to pattern design requirements. In this embodiment, it is acceptable as long as the first branch electrode 22a of each of the second axial electrodes 20 overlap one and the same first axial electrode 10. Moreover, although the shape of the first branch electrodes 22a is rectangular in this embodiment, other shapes, such as circular, triangular and polygonal shapes, etc., can be adopted in other embodiments and no restriction in this respect is imposed to the present invention.

In this embodiment, the first branch electrodes 22a of each of the second axial electrodes 20 have areas different from one another and are arranged along the first axial direction in order of area. For instance, as shown in FIG. 3, the areas of the first branch electrodes 22a of a leftmost one of the second axial electrodes 20 gradually decrease from a top side of the first axial direction to a bottom side of the first axial direction, i.e., a top-to-bottom direction. That is to say, the first branch electrodes 22a disposed more proximately to the bottom side of the first axial direction have smaller areas. In addition, the areas of the first branch electrodes 22a of the second leftmost one of the second axial electrodes 20 gradually increase in the top-to-bottom direction. That is to say, the first branch electrodes 22a disposed more proximately to the bottom side of the first axial direction have bigger areas. By such, the touch panel 1 of this embodiment includes two types of the second axial electrodes 20 alternately disposed. However, it should be noted that, in other embodiments, the arrangement of the second axial electrodes 20 may be opposite to that of this exemplary embodiment. That is to say, the areas of the first branch electrodes 22a of the leftmost one of the second axial electrodes 20 may gradually increase along the top-to-bottom direction, and the areas of the first branch electrodes 22a of the second leftmost one of the second axial electrode 20 may gradually decrease along the top-to-bottom direction.

The touch panel 1 of this embodiment further includes a plurality of conductive wires 40 that are disposed at the trace region 50 and that are electrically coupled to the first and second axial electrodes 10, 20 for providing signal transmission between a rear-end processor (not shown in the drawings) and the first and second axial electrodes 10, 20. It is worth noting that, the trace region 50 may be disposed at one side of the first and second axial electrodes 10, 20 along the first axial direction since both of the first and second axial electrodes 10, 20 extend along the first axial direction. For example, as shown in FIG. 1, the trace region 50 of this embodiment is only disposed at a top side of the first and second axial electrodes 10, 20 along the Y direction. That is to say, the non-viewable area (NV) is only located on top of the viewable area (V) instead of having two non-viewable areas disposed on two adjacent sides of the viewable area (V). By such, the touch panel 1 may have a relatively large viewable area (V) and may reduce frame thickness or even become frameless at three sides thereof.

In addition, the touch panel 1 further includes a substrate 100 for supporting at least one of the first and second axial electrodes 10, 20. The stacking-layer structure of the touch panel 1 will be described below in association with the sectional views.

Figure 4:
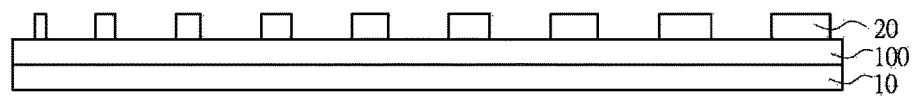
FIG. 4 is a sectional view of the exemplary embodiment taken along line A-A' in FIG. 1.

As shown in FIG. 1 and further referring to FIG. 4, in this embodiment, the first and second axial electrodes 10, 20 are correspondingly disposed on two opposite sides of the substrate 100. More specifically speaking, the first axial electrodes 10 are formed at a bottom surface of the substrate 100, and the second axial electrodes 20 are formed at a top surface of the substrate 100, so that the first and second axial electrodes 10, 20 are mutually insulative via the substrate 100.

Figure 5:
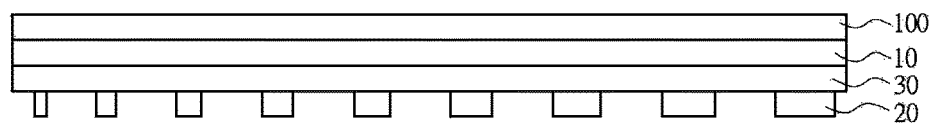
FIG. 5 is a sectional view of another exemplary embodiment.

As shown in FIG. 1, and further referring to FIG. 5, a sectional view of another exemplary embodiment of the touch panel according to the present invention is illustrated. In such an embodiment, the first axial electrodes 10 or the second axial electrodes 20 are disposed on one surface of the substrate 100. As shown in FIG. 5, here, the first axial electrodes 10 are disposed on one surface of the substrate 100. However, instead of the first axial electrodes 10, the second axial electrodes 20 may be disposed on said surface of the substrate 100 in other embodiments according to the present invention. In this embodiment, the touch panel 1 further includes an insulating layer 30 disposed on the first axial electrodes 10 opposite to the substrate 100, and the second axial electrodes 20 are disposed on the insulating layer 30. As such, the first and second axial electrodes 10, 20 are mutually insulative through the insulating layer 30. The insulating layer 30 may be an optical adhesive, so that the second axial electrodes 20 may be formed on another substrate and attached onto the first axial electrodes 10 through the insulating layer 30.

Figure 6:
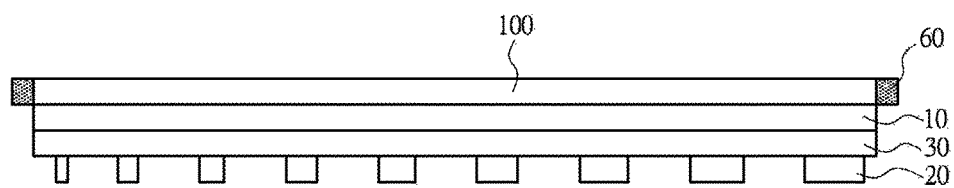
FIG. 6 is a sectional view of yet another exemplary embodiment.

As shown in FIG. 1 and further referring to FIG. 6, a sectional view of yet another exemplary embodiment is illustrated. The structure of this embodiment is substantially identical to that of the embodiment shown in FIG. 5. The difference resides in that, in this embodiment, the substrate 100 is a strengthened substrate not only for supporting but also for providing protection to the first and second axial electrodes 10, 20. Moreover, the touch panel of this embodiment further includes a cover layer 60 formed on a surface of the substrate 100 to define the non-viewable area (NV). As such, the trace region 50 can thus be formed on a top surface of the cover layer 60 to be in the non-viewable area (NV).

It should be noted that, the stacking-layer structures of the aforesaid exemplary embodiments of the touch panel 1 shown in FIGS. 4 to 6 are only for illustrating the position relationship among components of the touch panel 1 and are not intended to limit the scope of the present invention.

Figure 7:
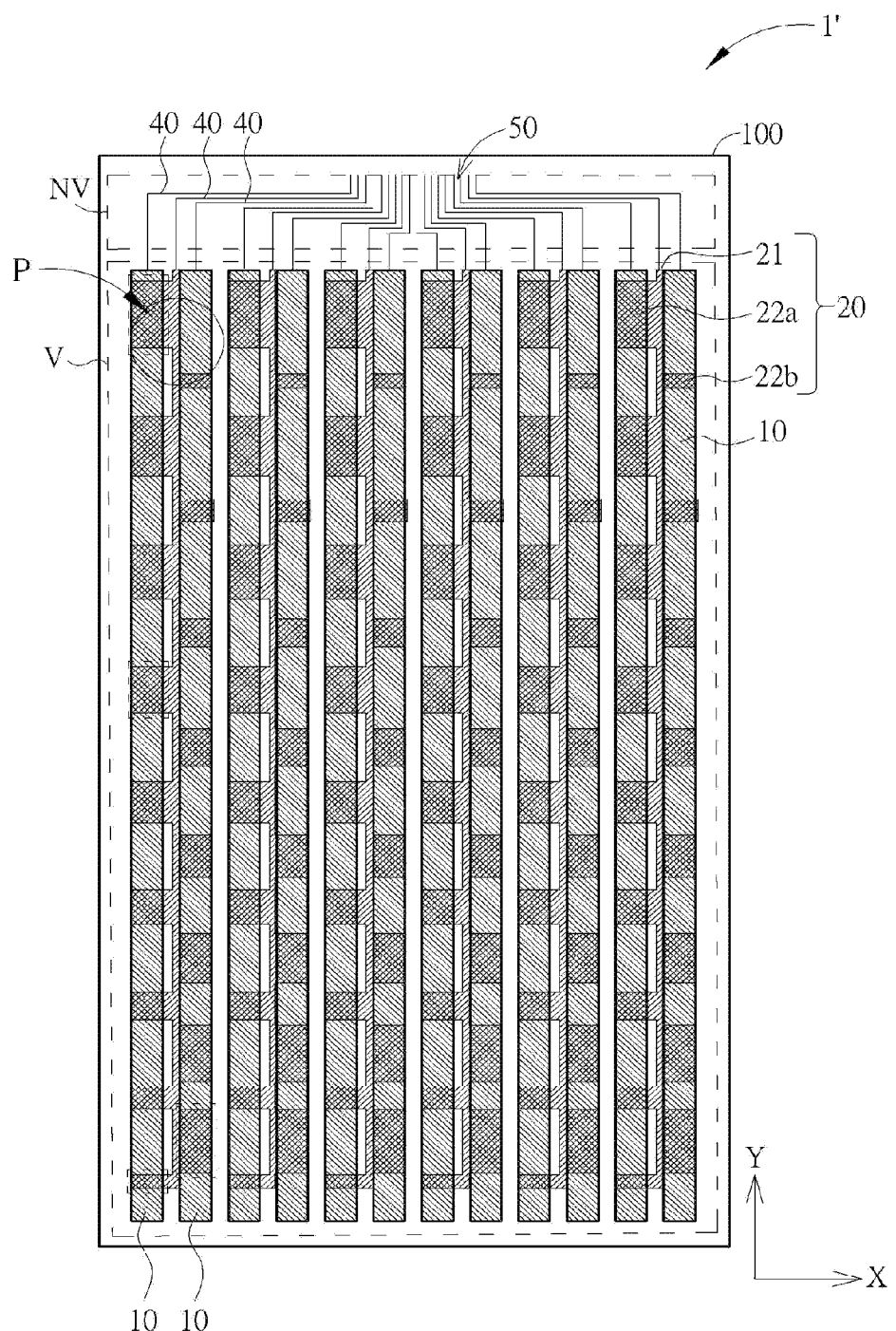
FIG. 7 is a structural schematic view of yet another exemplary embodiment of the touch panel according to the present invention.
Figure 8:
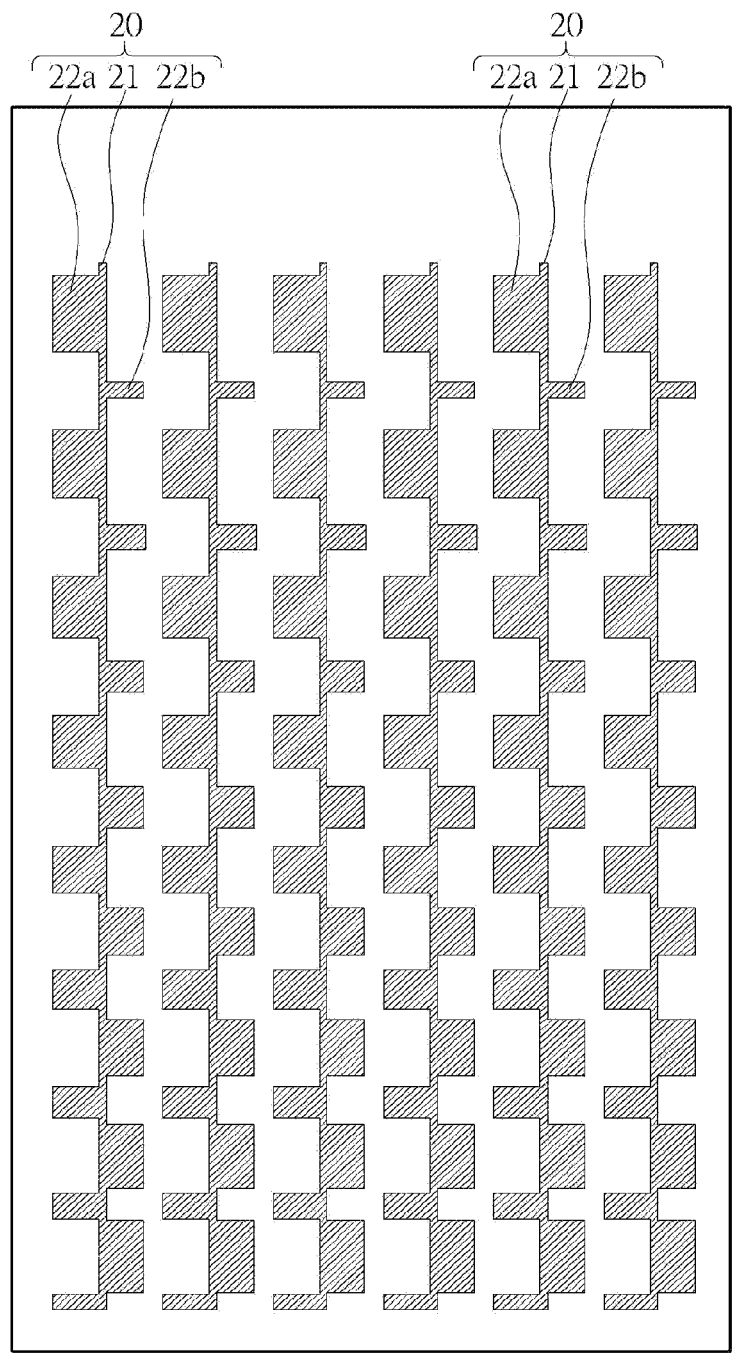
FIG. 8 is a schematic view of the exemplary embodiment of FIG. 7, illustrating the second axial electrodes.

Referring to FIGS. 7 and 8, another embodiment of the touch panel 1', as well as the second axial electrodes 20' thereof, is illustrated. It should be mentioned in advance that the first axial electrodes 10 of this embodiment are similar to those of the aforesaid embodiment shown in FIG. 2. The touch panel 1' of this embodiment is similar to that shown in FIG. 1, with the difference residing in that each of the second axial electrodes 20' overlaps an adjacent pair of the first axial electrodes 10.

To be more specific, in this embodiment, each of the second axial electrodes 20' includes a central electrode 21, a plurality of first branch electrodes 22a electrically coupled to the central electrode 21 and having areas different from one another, and a plurality of second branch electrodes 22b electrically coupled to the central electrode 21 and having areas different from one another. Here, for each of the second axial electrodes 20', the first branch electrodes 22a are disposed one side of the central electrode 21 with the second branch electrodes 22b disposed at the opposite side of the central electrodes 21, so that the first and second branch electrodes 22a, 22b overlap the two first axial electrodes 10 of the corresponding adjacent pair. In other words, the second branch electrodes 22b extend from the central electrode 21 and oppositely to the first branch electrodes 22a along the second axial direction. For instance, the first branch electrodes 22a may extend toward a left side of the second axial direction, and the second branch electrodes 22b may extend toward a right side of the second axial direction opposite to the first branch electrodes 22a.

Moreover, in this embodiment, the order to arrange the second branch electrodes 22b of each of the second axial electrodes 20' with respect to the areas thereof may be opposite to that of the first branch electrodes 22a. For instance, the first branch electrode 22a may be arranged in an incremental order along the top-to-bottom direction with respect to the areas thereof, and the second branch electrodes 22b may be arranged in an incremental order along a bottom-to-top direction with respect to the areas thereof (i.e., in a decremental order along the top-to-bottom direction). It should be noted that opposite conditions, namely a decremental order along the top-to-bottom direction for the first branch electrodes 22a and an incremental order for the second branch electrodes 22b would suffice in other embodiments according to the present invention.

The first axial electrodes 10 and the second axial electrodes 20, 20' of the aforesaid embodiments may include a transparent conductive material. Examples of the transparent conductive material may include, but are not limited to, indium tin oxide (ITO), indium zinc oxide (IZO), cadmium tin oxide (CTO), aluminum zinc oxide (AZO), indium tin zinc oxide (ITZO), zinc oxide, cadmium oxide, hafnium oxide (HfO), indium gallium zinc oxide (InGaZnO), indium gallium zinc magnesium oxide (InGaZnMgO), indium gallium magnesium oxide (InGaMgO), indium gallium aluminum oxide (InGaAlO), graphene, silver nanowires, carbon nanotubes (CNTs) and the like.

A sensing method of the touch panel according to the present invention is described herein below. According to the structures of the touch panels 1, 1' respectively shown in FIGS. 1 and 7, the first axial electrodes 10 usually serve as sensing electrodes, and the second axial electrodes 20, 20' usually serve as driving electrodes when in operation with the rear-end processor. The difference between the touch panels 1, 1' of the aforesaid embodiments respectively shown in FIGS. 1 and 7 resides in that each of the second axial electrodes 20 in the touch panel 1 of FIG. 1 cooperates with a respective one of the first axial electrodes 10 to perform a sensing function, while each of the second axial electrodes 20' in the touch panel 1' of FIG. 7 cooperates with a respective pair of the first axial electrodes 10. For the sake of brevity, the sensing method of the present invention is exemplified using the touch panel 1' of FIG. 7.

Since the actual dimensions of the first and second axial electrodes 10, 20' are much smaller than an object (such as a finger) to be sensed, preferably in one embodiment a differential operation based on a pair of the first axial electrodes 10 may be performed, where the pair of the first electrodes 10 correspond to a respective one of the second axial electrodes 20'. People having ordinary skill in the art will appreciate that when a user touches the touch panel 1', variation of a coupling capacitance may occur between the first axial electrode 10 and the second axial electrode 20' which correspond in position to a touch spot. By determining a ratio of the variations of the coupling capacitance between the two first axial electrodes 10 of the same pair, the actual touch point can be calculated. Here, since the variation of the coupling capacitance is proportional to the area of the first (or second) branch electrode 22a' (or 22b') corresponding in position to the touch spot, a linear relationship (incremental or decremental) of the variation of the coupling capacitance with respect to the areas of the first (or second) branch electrodes 22a (or 22b) of each of the second axial electrodes 20 is preferred, so as to allow the processor to better perform the differential operation.

When in real operation, the processor generates driving signals to the second axial electrodes 20'. When a touch point is generated by the user, the processor may determine which one (or multiple ones) of the first axial electrodes 10 generates the capacitance variation, so as to determine an X-coordinate of the touch point. Thereafter, when the processor receives signals from the first and second branch electrodes 22a, 22b of the second axial electrode 20' corresponding in position to the touch point, a Y-coordinate of the touch point can be determined by calculating a difference ratio between a first coupling capacitance and a second coupling capacitance, where the first coupling capacitance occurs between the first branch electrodes 22a and a corresponding one of the first axial electrodes 10, and the second coupling capacitance occurs between the second branch electrodes 22b and a corresponding one of the first axial electrodes 10.

As shown in FIG. 7, where a touch point (P) is generated, the leftmost one of the first axial electrodes 10 and the second leftmost one of the first axial electrodes 10 will have the largest capacitive variation, so that the processor can obtain the X-coordinate of the touch point by determining which one of the second axial electrodes 20' corresponds to the aforesaid first axial electrodes 10. On the other hand, the coupling capacitance between the leftmost one of the first axial electrodes 10 and the first branch electrodes 22a of the corresponding one of the second axial electrodes 20' may have a specific ratio with the coupling capacitance between the second leftmost one of the first axial electrodes 10 and the second branch electrodes 22b of the corresponding one of the second axial electrodes 20' due to the opposite linear variation arrangements of the first and second branch electrodes 22a, 22b. The Y-coordinate of the touch point (P) can therefore be determined by the processor based on that specific ratio. In addition, when multiple touch points are generated simultaneously, the touch panel of the present invention can perform multiple-point sensing function utilizing the aforesaid single-point sensing method through sensing time variance of sampling by the processor.

To sum up, all electrodes of the touch panel according to the present invention extend along one single direction, so that the conductive wires can be disposed at one side of the viewable area, meaning that the cover layer only needs to be provided at one side to form the non-viewable area. With the total area of the touch panel fixed, the viewable area can be greatly increased. In addition, the layout design of the present invention can be effectively simplified, and the frame thickness may be reduced or even achieve frameless design at three sides thereof.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A touch panel, comprising:
   a plurality of first axial electrodes extending along a first axial direction;
   a plurality of second axial electrodes extending along said first axial direction and disposed to insulatively correspond to said first axial electrodes, wherein:
   each of said second axial electrodes comprises a central electrode and a plurality of first branch electrodes that are electrically coupled to said central electrode,
   a first branch electrode of said first branch electrodes has a first area larger than a second area of a second branch electrode of said first branch electrodes, and
   each of said first branch electrodes overlaps a corresponding one of said first axial electrodes; and
   a trace region disposed at one side of said first axial electrodes and said second axial electrodes along said first axial direction.

2. The touch panel according to claim 1, further comprising a plurality of conductive wires that are disposed at said trace region and that are coupled electrically and correspondingly to said first axial electrodes and said second axial electrodes.

3. The touch panel according to claim 1, wherein said central electrode of each of said second axial electrodes is disposed at a space between an adjacent pair of said first axial electrodes.

4. The touch panel according to claim 1, wherein said first branch electrodes of each of said second axial electrodes are arranged in an incremental order with respect to areas thereof along said first axial direction.

5. The touch panel according to claim 1, wherein said first branch electrodes of each of said second axial electrodes extend from said central electrode along a second axial direction.

6. The touch panel according to claim 1, wherein each of said second axial electrodes overlaps an adjacent pair of said first axial electrodes.

7. The touch panel according to claim 6, wherein:
each of said second axial electrodes further comprises a plurality of second branch electrodes that are electrically coupled to said central electrode,
said second branch electrodes have areas different from one another,
said first branch electrodes and said second branch electrode of each of said second axial electrodes are disposed on opposite sides of said central electrode with said first branch electrodes overlapping one of said first axial electrodes of said adjacent pair and said second branch electrodes overlapping another one of said first axial electrodes of said adjacent pair.

8. The touch panel according to claim 7, wherein:
said first branch electrodes of each of said second axial electrodes are arranged in an incremental order with respect to said areas thereof from a first side of said first axial direction to a second side of said first axial direction that is opposite to said first side; and
said second branch electrodes of each of said second axial electrodes are arranged in an incremental order with respect to said areas thereof from said second side of said first axial direction to said first side of said first axial direction.

9. The touch panel according to claim 7, wherein said first branch electrodes and said second branch electrodes of each of said second axial electrodes extend oppositely from said central electrode along a second axial direction.

10. The touch panel according to claim 1, further comprising a substrate to support at least one of said first axial electrodes or said second axial electrodes.

11. The touch panel according to claim 10, wherein said first axial electrodes and said second axial electrodes are disposed on opposite sides of said substrate.

12. The touch panel according to claim 10, wherein:
one of said first axial electrodes or said second axial electrodes are directly disposed on said substrate, and
said touch panel further comprises an insulating layer to insulate said first axial electrodes from said second axial electrodes.

13. The touch panel according to claim 12, wherein said insulating layer is an optical adhesive.

14. The touch panel according to claim 10, wherein said substrate is a strengthened substrate.

15. The touch panel according to claim 14, further comprising a cover layer formed on a top surface of said substrate to define a non-viewable area.

16. The touch panel according to claim 15, wherein said trace region is disposed on said cover layer and corresponds in position to said non-viewable area.

17. The touch panel according to claim 10, wherein each of said first branch electrodes overlaps a corresponding one of said first axial electrodes in a direction perpendicular to a top surface of the substrate.

* * * * *